United States Patent
Perlo et al.

(10) Patent No.: US 6,854,686 B2
(45) Date of Patent: Feb. 15, 2005

(54) VTOL AIRCRAFT

(75) Inventors: Piero Perlo, Sommariva Bosco (IT); Denis Bollea, Fiano (IT); Stefano Alacqua, Cascine Vica-Rivoli (IT); Roberto Finizio, Orbassano (IT); Cosimo Carvignese, Orbassano (IT); Elena Balocco, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 10/626,704

(22) Filed: Jul. 25, 2003

(65) Prior Publication Data

US 2004/0129827 A1 Jul. 8, 2004

(30) Foreign Application Priority Data

Jul. 26, 2002 (IT) ....................... TO2002A0666

(51) Int. Cl.⁷ .................... B64C 29/00; B64C 27/20
(52) U.S. Cl. ..................... 244/7 B; 244/23 R
(58) Field of Search .............. 244/7 B, 23 R, 244/23 C, 34 A, 71

(56) References Cited

U.S. PATENT DOCUMENTS

| | | | | |
|---|---|---|---|---|
| 2,043,704 A | * | 6/1936 | McPherren | 244/7 B |
| 3,128,970 A | * | 4/1964 | Tinajero et al. | 244/100 R |
| 3,252,537 A | | 5/1966 | Tarran | |
| 3,584,810 A | * | 6/1971 | Velton | 244/23 C |
| 4,037,807 A | * | 7/1977 | Johnston et al. | 244/7 B |
| 5,575,438 A | * | 11/1996 | McGonigle et al. | 244/13 |

FOREIGN PATENT DOCUMENTS

| | | |
|---|---|---|
| EP | 0 661 206 A1 | 7/1995 |
| FR | 1 331 306 A | 7/1963 |

* cited by examiner

Primary Examiner—Robert P. Swiatek
(74) Attorney, Agent, or Firm—Sughrue Mion, PLLC

(57) ABSTRACT

VTOL aircraft comprising a first and a second ducted rotor positioned at the ends of a vertical fuselage and whose propellers are driven to rotate in mutually opposite directions. Control flaps for orientation and transverse flight are operatively associated at least to the lower ducted rotor.

1 Claim, 5 Drawing Sheets

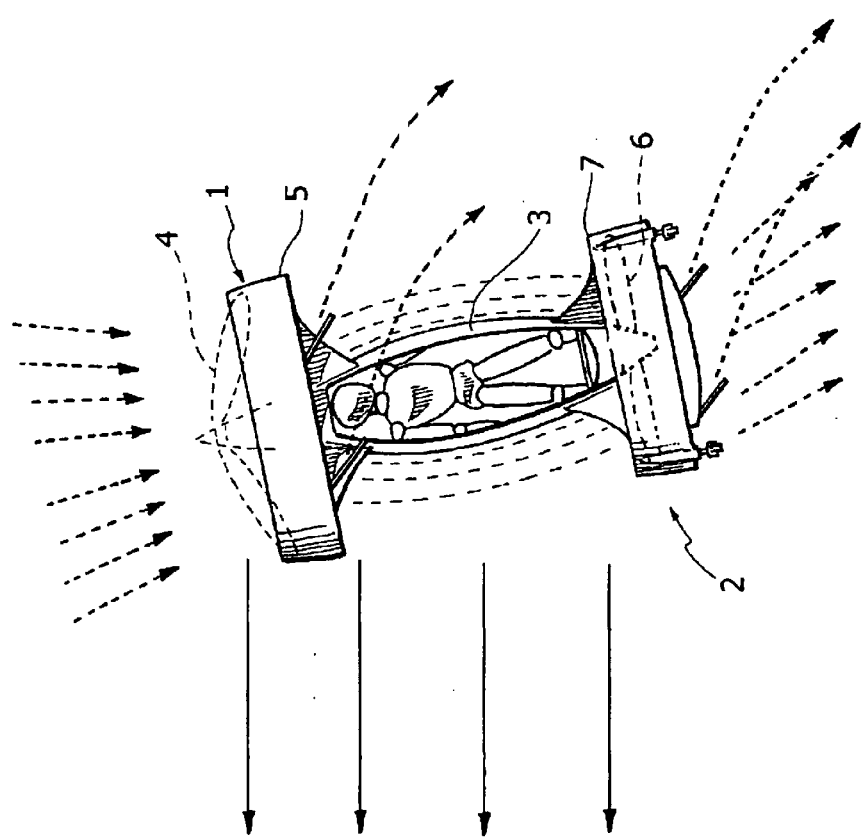

VTOL AIRCRAFT

FIELD OF THE INVENTION

The present invention relates to a VTOL aircraft, i.e. an aircraft with Vertical Take-Off and Landing, having a new and original configuration, such as to allow it to have a very high flexibility of use in a multiplicity of fields of application, with or without a pilot aboard.

SUMMARY OF THE INVENTION

The VTOL aircraft according to the invention is essentially characterised in that it comprises:

a first ducted rotor and a second ducted rotor, mutually aligned and distanced according to a vertical axis and distanced according to a vertical axis and each including a propeller rotatable within an annular cowling, a vertical load bearing structure defining a fuselage at whose upper and lower ends are connected the annular cowlings respectively of said first and said second rotor, first and second motorised means positioned at said ends of the fuselage to drive the propellers of said first and said second rotor in mutually opposite directions of rotation, and control means operatively associated at least to said lower rotor.

The aircraft according to the invention is able to fly in remote mode, i.e. without a pilot, in order to operate in environments with severe hazards to humans or to rescue persons in areas that are impervious, difficult to reach overland or dangerous. Alternatively, the fuselage of the aircraft can accommodate at least a pilot, in erect condition.

According to a preferred embodiment of the invention, the upper rotor is larger, for instance in the order of 20%, than the lower rotor, which allows to improve the stability of the aircraft in flight.

Moreover, the fuselage advantageously has a general teardrop configuration in order to convey the airflow generated in the use of the first rotor towards the second rotor, thereby improving the overall efficiency of the aircraft thanks to a Coanda effect.

BRIEF DESCRIPTION OF THE DRAWINGS

Further characteristics and advantages of the invention shall become readily apparent by the detailed description that follows, with reference to the accompanying drawings, provided purely by way of non limiting example, in which:

FIG. 9 is a similar view to FIGS. 1 and 7 exemplifying a transverse flight mode of the aircraft according to the invention.

DETAILED DESCRIPTION OF THE INVENTION

Figure 2:
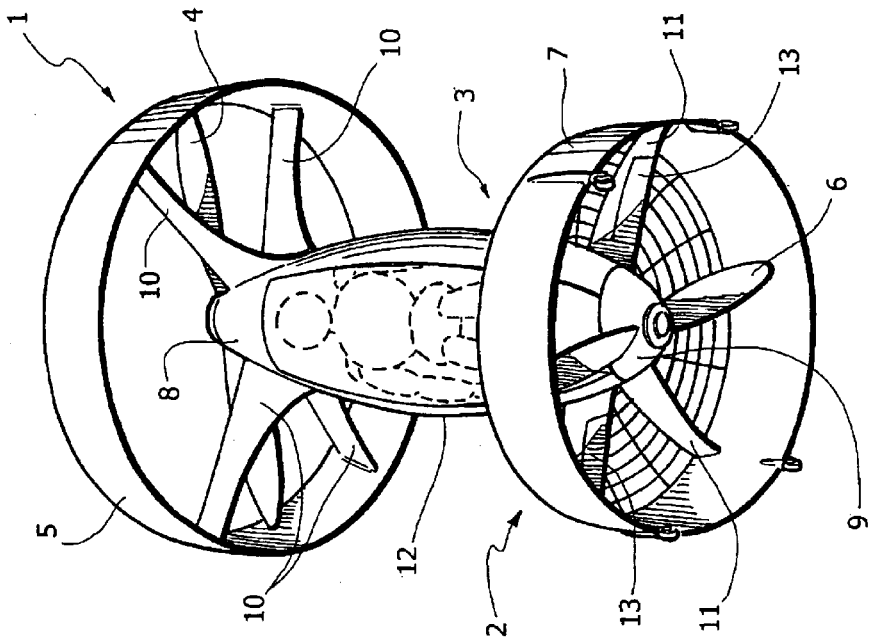
FIG. 2 is a perspective enlarged scale bottom view of the aircraft of FIG. 1.
Figure 1:
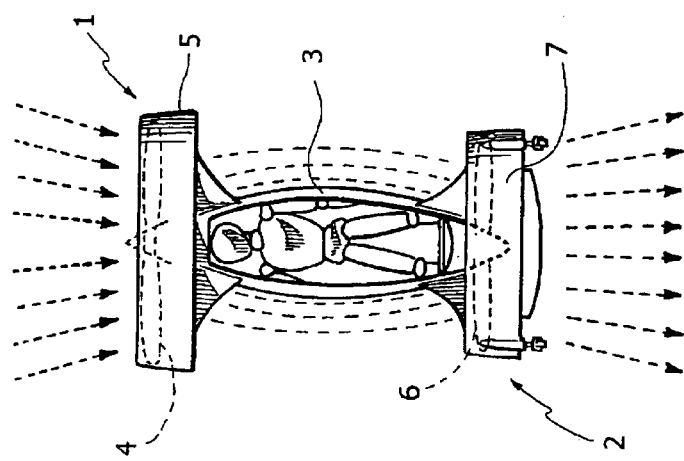
FIG. 1 is a schematic front elevation view of a VTOL aircraft according to the invention.

With initial reference to FIGS. 1 and 2, a VTOL aircraft according to an example of embodiment of the invention essentially comprises a first ducted rotor or upper rotor 1 and a second ducted rotor or lower rotor 2, mutually aligned and distanced according to a vertical axis and interconnected by a fuselage generically designated with the reference number 3.

Figure 7:
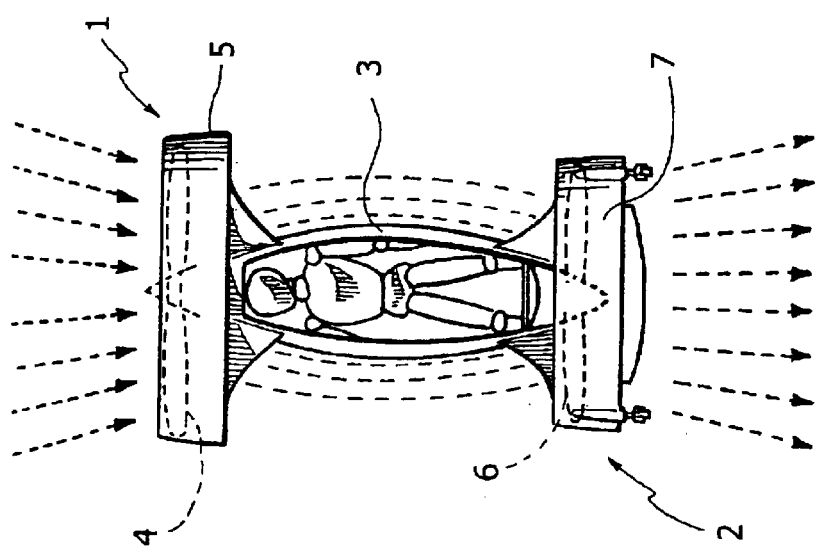
FIG. 7 shows a variation of FIG. 1.

The upper ducted rotor 1 consists of a propeller 4 able to rotate within a circularly shaped annular cowling 5 whose inner diameter is slightly greater than the longitudinal dimension of the propeller 4. The upper ducted rotor 1 can be of a traditional type (i.e. with the blades lying on a plane or it can be constructed as in the variation of FIG. 7 (i.e. with the blades forming an angle between them), to make more effective the attack of the profile on the air also in case of transverse flight (exemplified in FIG. 9).

Similarly, the lower rotor 2 includes a propeller 6 able to rotate within a circularly shaped annular cowling 7 whose inner diameter is slightly greater than the longitudinal dimension of the propeller 6.

The configuration of the two rotors 1 and 2 can be similar: however, in accordance with the preferred embodiment of the invention shown in the drawings, the upper rotor 1 advantageously has dimensions which are about 20% greater than those of the lower rotor 2.

The shape of the propellers 4 and 6 is optimised in order to generate the best possible thrust. Moreover, the two propellers 4 and 6 advantageously have different profiles in order to optimise thrust according to the airflows on the propellers themselves: the upper propeller 4 receives air whose velocity is equal to the climbing velocity of the aircraft, during its ascending motion, whilst the lower propeller 6 also receives the air exiting the upper rotor 1, which tends to spin onto itself because of the rotation imparted by the propeller.

In any case the two ducted rotors 1, 2 will be designed and optimised for the cruising speed of the aircraft and in such a way as to allow an improvement of the airflows passing from the upper propeller 4 to the lower propeller 6.

The choice of the ducted rotors 1 and 2 is linked to the advantages of this configuration with respect to the case of non ducted propellers, both in terms of operating noise reduction, and for the purposes of the protection due to the fact that the propellers 4 and 6 are confined within respective rigid structures 5, 7 and allow to reduce the overall dimensions of the aircraft for the same thrust developed by the ducted rotors 1, 2 relative to free propellers. Moreover, the cascade coupling of the two ducted rotors 1, 2 increases thrusting efficiency relative to total power developed. By way of indication, the two ducted rotors 1, 2 axially distanced from each other are more efficient (about 40% less power required) than a system with counter-rotating blades of a same ducted rotor.

The propellers 4, 6 are commanded to rotate in opposite directions normally by means of internal combustion engines. For example, for each propeller 4, 6 can be used two two-stroke engines with a displacement of 125 cc and 10 HP of power, which assure at the same time high power and low weights (about 2.8 kg per engine) In the configuration in which the upper ducted rotor 1 has a larger diameter, 250 cc engines can also be used for it.

The engines in question, not shown herein for the sake of simplicity of representation, are housed inside the opposite ends of the fuselage 3, designated respectively as 8 and 9, and said ends support the annular cowlings 5 and 7 of the two ducted rotors 1, 2 by means of respective radial spokes or arms 10, 11.

Figure 3:
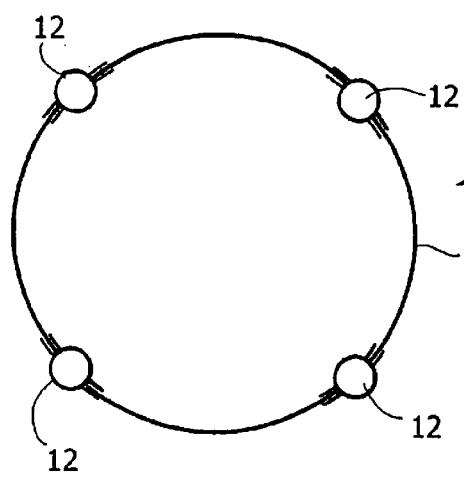
FIG. 3 is a schematic partial cross section enlarged scale view of the fuselage of the aircraft.

The fuselage 3 has a general teardrop shape, vertically elongated, and it has the purpose of conveying the airflows from the first ducted rotor 1 to the second ducted rotor 2 (Coanda effect) thereby improving the overall efficiency of the aircraft. Said fuselage 3 consists of a load-bearing structure constituted, as shown in greater detail in FIG. 3, by a series (in the illustrated embodiment, four) of tubular uprights 12, which can advantageously serve as fuel tanks for the engines, and by an encompassing structure 3 serving simply as a shelter, fully or partly transparent. The dimensions of the fuselage 3 are such as to be able to accommodate at least a human being in the erect position, as shown with dashed lines in FIG. 2, in addition to—as explained above—the engines driving the propellers 4 and 6, as well as the control apparatuses and the aircraft control electronics.

Figure 8:
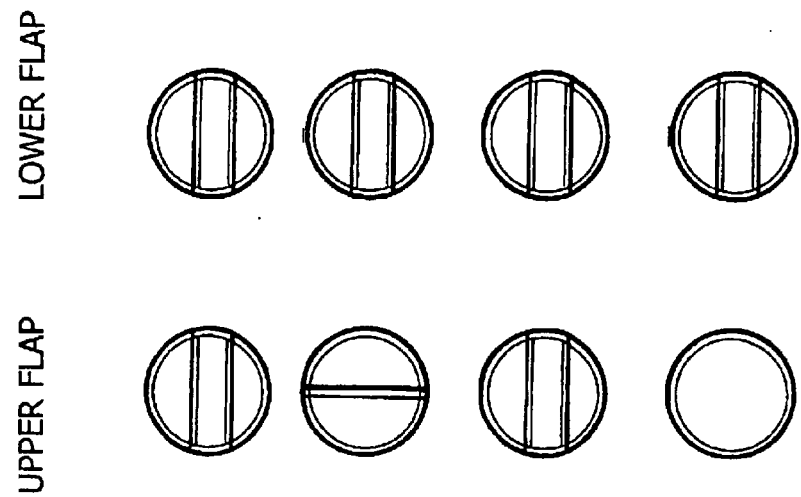
FIG. 8 is a diagram showing different alternative configurations of the control flaps of the aircraft.

The aircraft control system comprises directional flaps able to assure complete control in any direction. In the case of the illustrated example, two diametrically opposite flaps 13 are provided, borne by the lower ducted rotor 2, more specifically by a pair of diametrically opposite radial arms 11 thereof. According to possible variations, two pairs of flaps 13 in crossed arrangement, and also additional directional flaps can be associated with the upper ducted rotor 1. As shown schematically in FIG. 8, which illustrates different possible alternative solutions for determining the directionality of the aircraft, the flaps can also be provided below the two rotors 1, 2. In this case, the flaps are positioned at the output of the flow of the rotors 1, 2 and can operate independently from each other or in mutually co-ordinated fashion.

Figure 4:
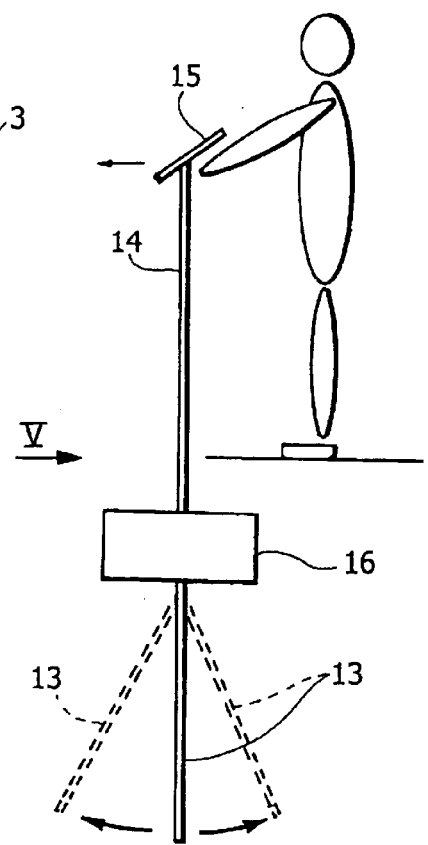
FIG. 4 is a diagrammatic view showing a possible mode of controlling the vehicle by a pilot positioned inside the fuselage.
Figure 5:
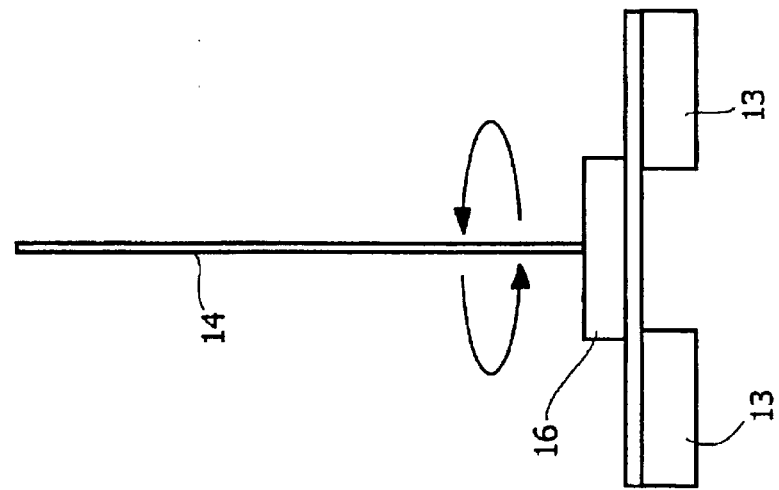
FIG. 5 is a partial front elevation view of FIG. 4.

In case of operation with pilot aboard, the flaps 13, as shown schematically in FIGS. 4 and 5, are commanded by a lever 14 which can be operated manually by means of a control 15. In this way, the flaps 13 can be moved angularly or made to rotate by acting on the control 15.

In the case of operation without a pilot aboard, the flaps 13 are controlled by an inertial system housed in the fuselage 13 and set to recognise the movements of the aircraft relative to a reference system. The signals provided by the inertial system drive appropriate actuators, schematically indicated by the block 16, comprising in general conventional fashion springs, shape memory wires, leverages, gears, etc., which in turn control the flaps and hence the overall motion of the aircraft.

Both in case of manual piloting and in case of piloting without a person aboard the flaps 13 can be controlled independently, to enable controlling the heading and attitude of the aircraft at all times.

Use of flaps not just on the lower ducted rotor 2 but also on the upper rotor 1 allows for a quicker response of the aircraft to controls, making possible more agile manoeuvres even in relatively restricted spaces.

Figure 6:
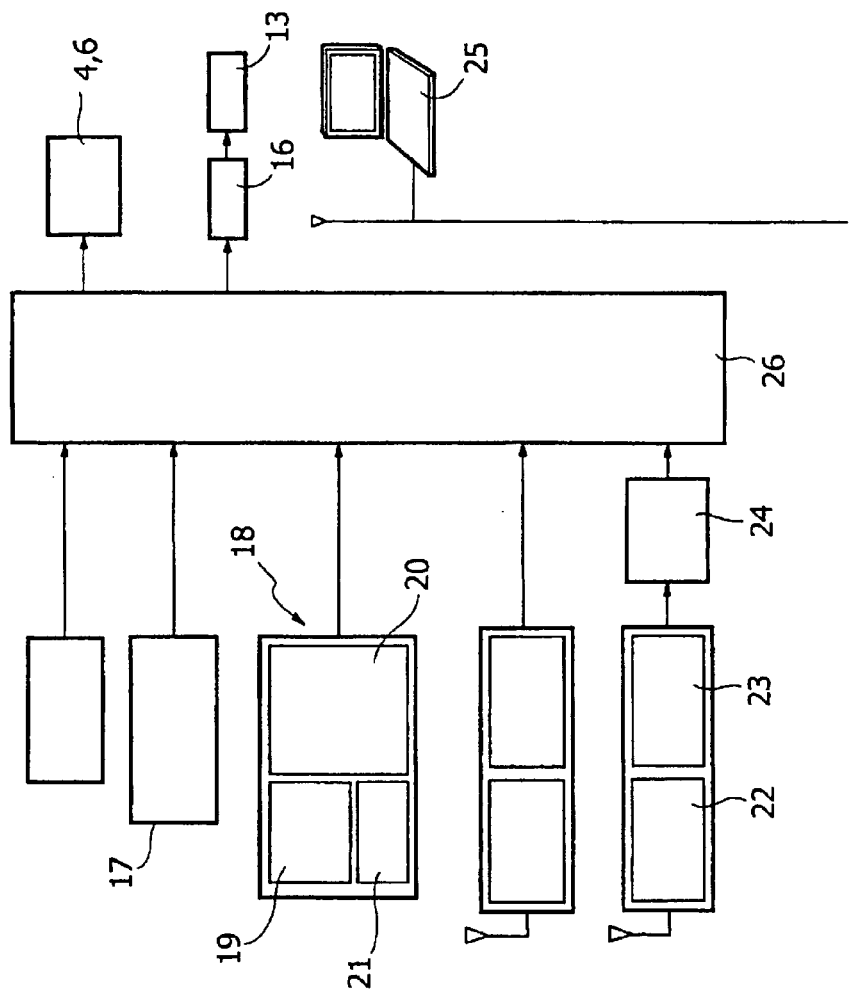
FIG. 6 is a block diagram showing an electronic control apparatus that can normally be installed aboard the aircraft.

FIG. 6 shows a block diagram of the on-board electronic system of the aircraft, which can be powered by batteries and/or fuel cells and/or solar cells, indicated by the block 17. The function of the on-board electronics has the main purpose of assuring stability and control, to allow the operation of the various installed sensors and to receive and transmit data from and to the ground.

To manage stability and control, the electronic system is operatively connected to a group of inertial navigation sensors 18 including gyroscopes and accelerometers 19, magnetic sensors 20 constructed with MEMS technology, and GPS receivers 21. The data provided by these sensors are analysed by means of a microprocessor 26 which provides the input data for managing the engines to drive the propellers 4 and 6 and the actuators 16 of the control flaps 13. The aircraft can also house one or more television cameras 22, which may be traditional or infrared, whose sensors can be of the CMOS type or with photodiode matrices integrated with VLSI electronics. The television cameras also serve as a system for stabilising the aircraft by means of optical flow and CNN (Cellular Neural Network) techniques and as a collision prevention, altitude control system, etc. The television cameras also serve to record images and video, compressed with MPEG devices 24, on a recorder 23.

Lastly, the electronic system must be able to manage data communication with a remote base station, schematically indicated as 25, and with other aircraft: said communication advantageously takes place in radio frequency.

The aircraft according to the invention can be built from several innovative materials. An example consists of composite carbon fibre materials, able to offer greater structural rigidity and limited weight than do traditional materials such as aluminium or titanium. Moreover, the system for controlling the flaps 13 can be made of traditional materials (springs, leverages, gears, etc.) or, more advantageously, by active "smart materials", able to modify their mechanical characteristics if stimulated from the exterior with electrical, thermal, magnetic signals, etc. Among the main active materials that can be employed, one can mention ceramics and piezoelectric polymers, magneto-resistive materials, shape memory materials, electro-active polymers and magneto-electrorheological fluids.

The flight dynamics of the aircraft according to the invention are readily apparent: both in remote, i.e. pilotless mode, and with a pilot aboard, the aircraft operates in VTOL (vertical take off and landing) mode. The mode provides for a vertical takeoff exploiting the ground effect of the lower ducted rotor 2 whereto is added the action of the upper ducted rotor 1, which allows to reduce the power required for take off.

During its flight, the aircraft always maintains the same attitude shown in FIG. 1, i.e. with its axis oriented vertically, and it is able to move in all directions both on the horizontal plane and on the vertical plane. During the landing phase, the aircraft remains vertical, gradually reducing engine power until it touches the ground.

Transverse flight is achieved, as shown schematically in FIG. 9, inclining the axis of the aircraft by an angle on the order of 15°, thus causing the upper rotor 1 to have a significant angle of attack. The angle of attack can be combined with the orientation of the flaps 13 on the upper rotor 1 and possibly on the lower rotor 2 to achieve transverse flight and in case of rapid manoeuvres, for instance to avoid obstacles.

Purely by way of example, in a possible embodiment the aircraft can have an overall height in the order of 260 cm with a diameter of the ducted rotors 1 and 2 in the order of 180 cm, respectively. The fuselage 3 is thus able easily to accommodate a 200 cm tall person, with low total weights.

The possible uses of the aircraft according to the invention are many: without a pilot aboard, i.e. when guided from the ground, it can be used for inspections or missions in locations that are impervious or considered dangerous to rescue persons in hardship situations, and also for surveillance and reconnaissance missions, eliminating risks to humans.

More specifically, possible fields of application of the aircraft according to the invention can be summarised as follows:
surveillance of industrial facilities (for instance nuclear plants, chemical and biotechnological industries);
monitoring civil structures such as bridges, buildings, skyscrapers, monuments, structures with difficult access (minefields, craters, rocky terrain);
searching for lost persons in impervious areas, natural disaster sites;

mass communication;

urban transport for short trips.

Naturally, construction details and embodiments may be widely changed from what is described and illustrated herein, without thereby departing from the scope of the present invention as defined in the claims that follow.

What is claimed is:

1. A vertical takeoff and landing aircraft, comprising:
   a first ducted rotor and a second ducted rotor mutually aligned and distanced according to a vertical axis and each including a propeller rotatable within a respective annular cowling,
   a vertical load bearing structure defining a fuselage to whose upper and lower ends are connected said annular cowlings respectively of said first and second rotor,
   first and second motorized means positioned at said ends of the fuselage to drive the propellers of said first and second rotor in mutually opposite directions, and
   control means operatively associated at least to said lower rotor,
   wherein said motorized means include for each ducted rotor a respective pair of internal combustion engines.

* * * * *